US008275375B2

(12) United States Patent
Lee

(10) Patent No.: US 8,275,375 B2
(45) Date of Patent: Sep. 25, 2012

(54) DATA INTEGRATION FOR WIRELESS NETWORK SYSTEMS

(76) Inventor: Jong Hyup Lee, Seoul (KR)

( * ) Notice: Subject to any disclaimer, the term of this patent is extended or adjusted under 35 U.S.C. 154(b) by 195 days.

(21) Appl. No.: 12/731,955

(22) Filed: Mar. 25, 2010

(65) Prior Publication Data

US 2011/0237254 A1   Sep. 29, 2011

(51) Int. Cl.
*H04W 4/00* (2009.01)
(52) U.S. Cl. .................. 455/435.2; 370/331; 370/493
(58) Field of Classification Search ............... 455/435.2, 455/436; 370/338
See application file for complete search history.

(56) References Cited

U.S. PATENT DOCUMENTS

| 5,394,158 | A | 2/1995 | Chia |
| 6,278,461 | B1 | 8/2001 | Ellenby et al. |
| 6,317,127 | B1 | 11/2001 | Daily et al. |
| 2001/0047300 | A1 | 11/2001 | Takashima et al. |
| 2002/0167536 | A1 | 11/2002 | Valdes et al. |
| 2005/0222931 | A1 | 10/2005 | Mamou et al. |
| 2006/0092883 | A1 | 5/2006 | Lee et al. |
| 2009/0191903 | A1 | 7/2009 | Fiatal |
| 2010/0003988 | A1 * | 1/2010 | Buckley et al. ............ 455/436 |
| 2010/0069072 | A1 * | 3/2010 | Gogic et al. ............... 455/436 |
| 2011/0145718 | A1 * | 6/2011 | Ketola et al. .............. 715/739 |
| 2011/0148924 | A1 * | 6/2011 | Tapley et al. ............. 345/634 |

OTHER PUBLICATIONS

International Search Report mailed Mar. 16, 2011 as received in related application No. PCT/KR2010/008552.
Xiaomin Ma, et al "Design and Performance Analysis of a New Soft Handoff Scheme for CDMA Cellular Systems" IEEE Transactions on Vehicular Technology, vol. 55, No. 5, Sep. 2006, pp. 1603-1612.
Yanfeng Zhang, et al "LeapFrog: Fast, Timely WiFi Handoff" IEEE Globecom 2007 proceedings.
Rajavelsamy R, et al "Performance Evaluation of VoIP over 3G-WLAN Interworking System" IEEE Communication Society / WCNC 2005, pp. 2312-2317.
Buyurman Baykal, et al "A QoS-Aware Handoff using RSVP in Next Generation Wireless Networks" Proceedings of the Eighth IEEE International Symposium on Computers and Communication (ISCC'03).
Eunsoo Shim, et al. "Low Latency Handoff for Wireless IP QOS with NeighborCasting" IEEE 2002.

* cited by examiner

*Primary Examiner* — Marcos Batista
(74) *Attorney, Agent, or Firm* — Maschoff Gilmore & Israelsen

(57) ABSTRACT

Techniques relating to an apparatus in communications with a wireless terminal through a wireless network system are provided. The apparatus may include a wireless terminal communication unit in communication with the wireless terminal through the wireless network system and configured to receive a list of one or more data sources from the wireless terminal, a data source communication unit configured to receive source data from the one or more data sources in the list, and a source data integration unit configured to use the source data to generate integrated data for transmission to the wireless terminal.

16 Claims, 10 Drawing Sheets

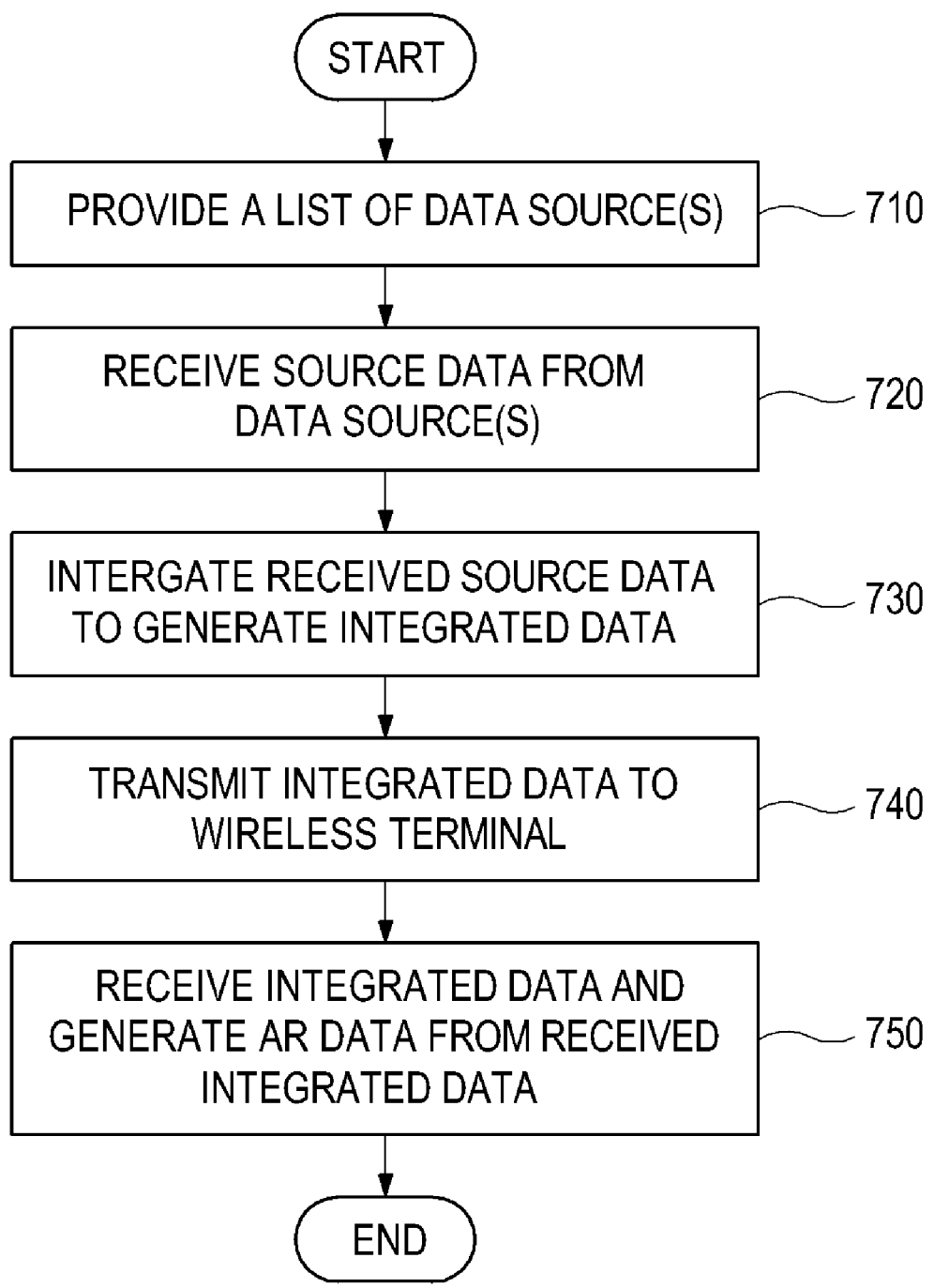

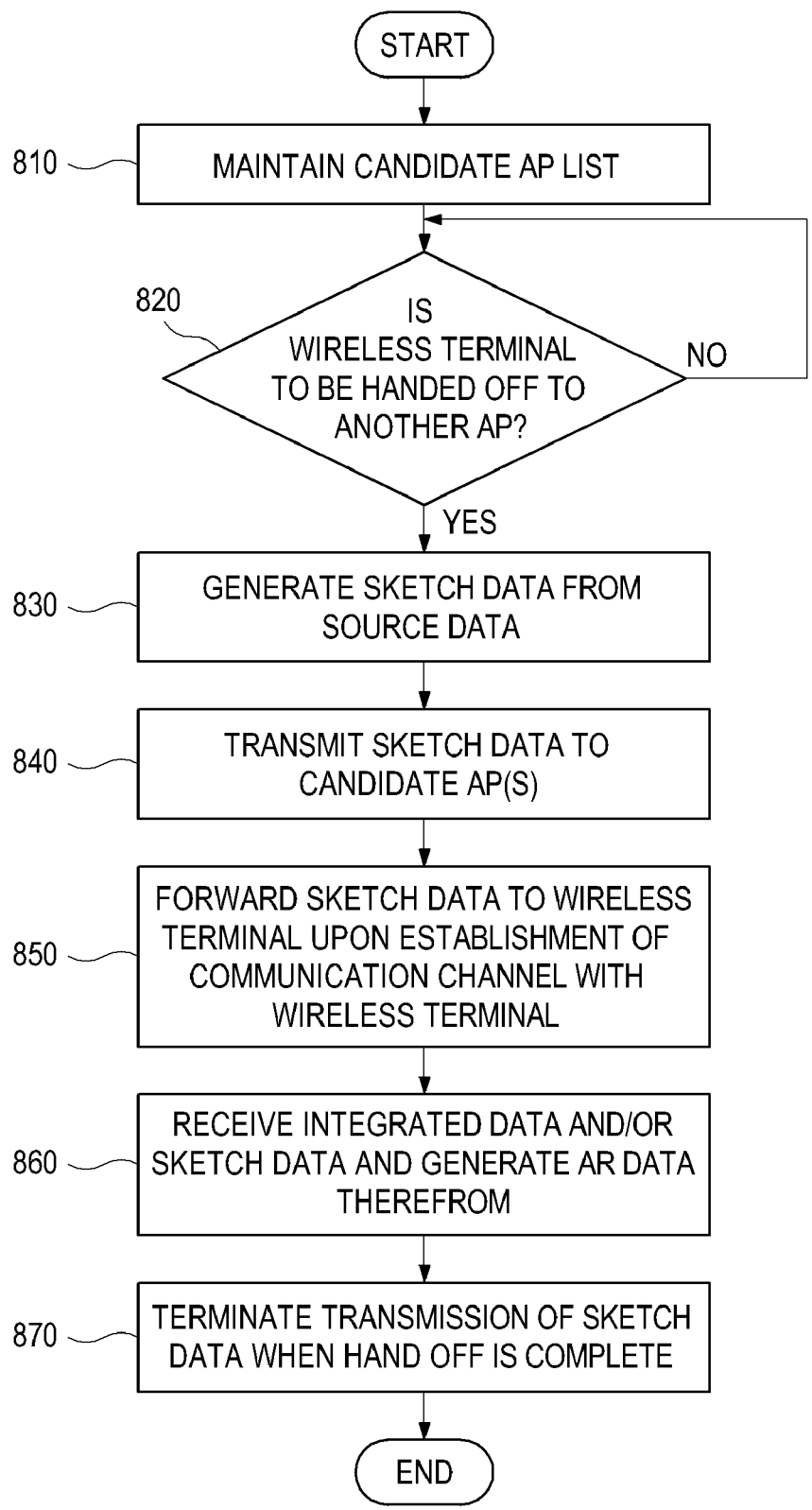

DATA INTEGRATION FOR WIRELESS NETWORK SYSTEMS

BACKGROUND

Data integration refers to the creation of an integrated view over various types of data typically collected from different sources. Augmented reality (AR) is one of these data integration technologies that enhances or augments a user's perception of the real world with virtual information generated from a data processing system (e.g. computer). In a typical AR system, a user's view of a real-world scene is overlaid or integrated with a computer-generated virtual image(s). It holds great promise in various fields of application, such as advertising, navigation, military services and entertainment to name a few.

SUMMARY

Techniques relating to an apparatus in communications with a wireless terminal through a wireless network system are provided. The apparatus may include a wireless terminal communication unit in communication with the wireless terminal through the wireless network system and configured to receive a list of one or more data sources from the wireless terminal, a data source communication unit configured to receive source data from the one or more data sources in the list, and a source data integration unit configured to use the source data to generate integrated data for transmission to the wireless terminal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 7 shows an example flow diagram of an illustrative embodiment for providing integrated data.

FIG. 8 shows an example flow diagram of an illustrative embodiment for providing sketch data.

DETAILED DESCRIPTION

Figure 1A:
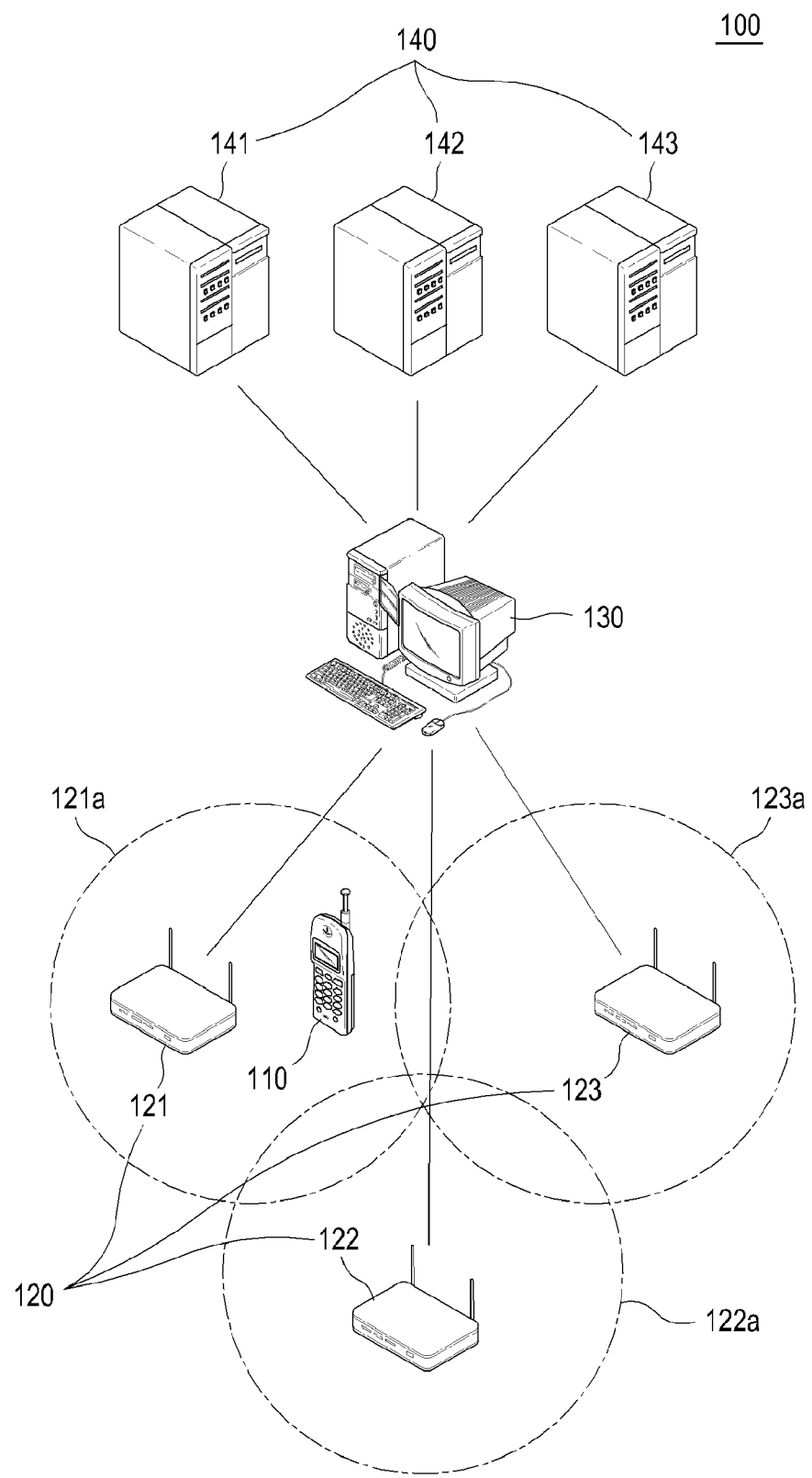
FIG. 1A shows a schematic block diagram of an illustrative embodiment of a wireless network system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It is to be understood that apparatus and methods according to the illustrative embodiments of the present disclosure may be implemented in various forms including hardware, software, firmware, special purpose processors, or a combination thereof. For example, one or more example embodiments of the present disclosure may be implemented as an application having a program or other suitable computer-executable instructions that are tangibly embodied on at least one computer-readable media such as a program storage device (e.g., hard disk, magnetic floppy disk, RAM, ROM, CD-ROM, or the like), and executable by any device or machine, including computers and computer systems, having a suitable configuration. Generally, computer-executable instructions, which may be in the form of program modules, include routines, programs, objects, components, data structures, etc. that perform particular tasks or implement particular abstract data types. The functionality of the program modules may be combined or distributed as desired in various embodiments. It is to be further understood that, because some of the constituent system components and process operations depicted in the accompanying figures can be implemented in software, the connections between system units/modules (or the logic flow of method operations) may differ depending upon the manner in which the various embodiments of the present disclosure are programmed.

Data integration service involves combining data supplied by different data sources and providing users with a unified view of these data. Augmented reality (AR) service is one of these data integration services that blends or integrates real world source data obtained from a real world scene by one or more sensors (e.g., real world images captured by a camera, real world sounds taken by a microphone, etc.) with virtual source data (e.g., virtual 3-dimensional (3D) objects, virtual 2-dimensional (2D) images, texts, and/or sounds stored in a storage), so as to (a) provide the illusion to users that the objects, sounds, or other features depicted by the virtual source data exist in the real world and/or to (b) provide information on the real world objects, sounds, or other features depicted by the real world source data to users. Such AR service may be provided by wireless terminals of a wireless network system with multiple data sources. Techniques described in the present disclosure employ a novel service agent that effectively reduces processing requirements and traffic overhead of a wireless terminal in providing AR or other types of data integration services.

Overview of Wireless Network System

Figure 1B:
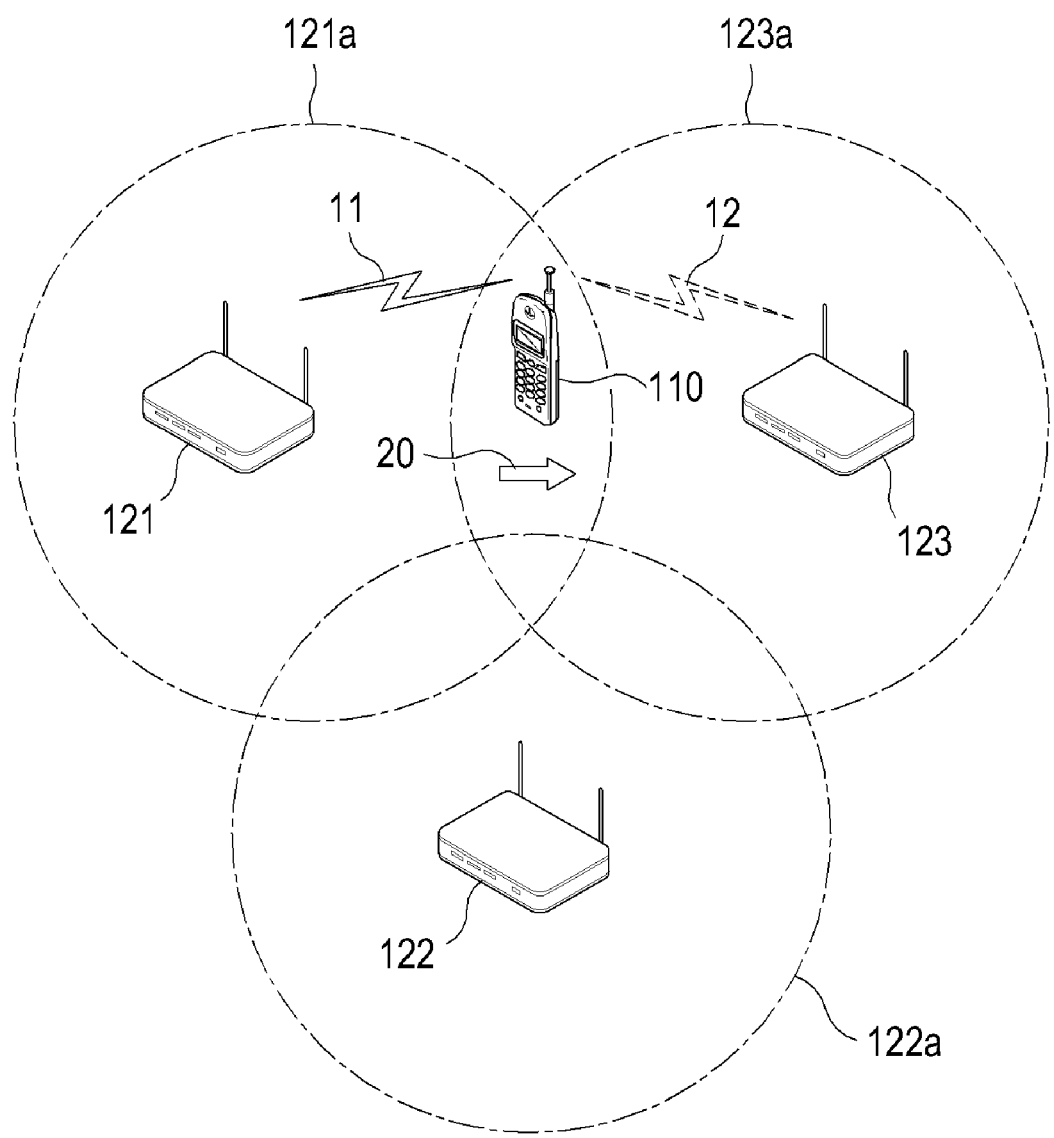
FIG. 1B shows a partial exploded schematic diagram of the wireless network system shown in FIG. 1A.

FIG. 1A shows a schematic block diagram of an illustrative embodiment of a wireless network system for providing an AR service. FIG. 1B shows a partial exploded schematic diagram of the wireless network system shown in FIG. 1A. Referring to FIGS. 1A and 1B, a wireless network system 100 may include a wireless terminal 110, multiple access points 121-123 (hereinafter collectively referred to as access points 120) configured to provide wireless access to wireless terminal 110 when located within their respective coverage areas 121a-123a, and an apparatus (e.g., a service agent 130) in communication with wireless terminal 110 through at least one of access points 120, and multiple data sources 141-143 (hereinafter collectively referred to as data sources 140) configured to provide one or more types of source data for the AR service.

In one embodiment, wireless terminal 110 may provide its location identifier (e.g., its Internet Protocol (IP) address) and a list including at least some of data sources 140 to service agent 130. Service agent 130, upon receiving the IP address and the list, may request and receive the source data (e.g., shape and texture data on a virtual object) from the data sources in the list, use the received source data to generate integrated data (e.g., texture-mapped virtual object), and transmit the integrated data to wireless terminal 110 based on the received IP address (e.g., transmit the integrated data pre-pended or appended with the IP address). In one embodiment, wireless terminal 110, upon receiving the integrated data, may perform further integration or association operation with the received integrated data to provide AR data to its users. For example, wireless terminal 110 may integrate or associate the received integrated data with other source data (e.g., a real world image captured by a camera installed in wireless terminal 110) to display an AR image (e.g., the real world image overlaid with an image of the texture-mapped virtual object) to its users. In another embodiment, in cases where the integrated data need no further integration or association operation (e.g., in cases where a real world image is provided by one of the listed data sources and are integrated with other source data at service agent 130), wireless terminal 110 may provide the integrated data as the AR data to its user(s) (e.g., display AR data on its display screen).

Figure 2A:
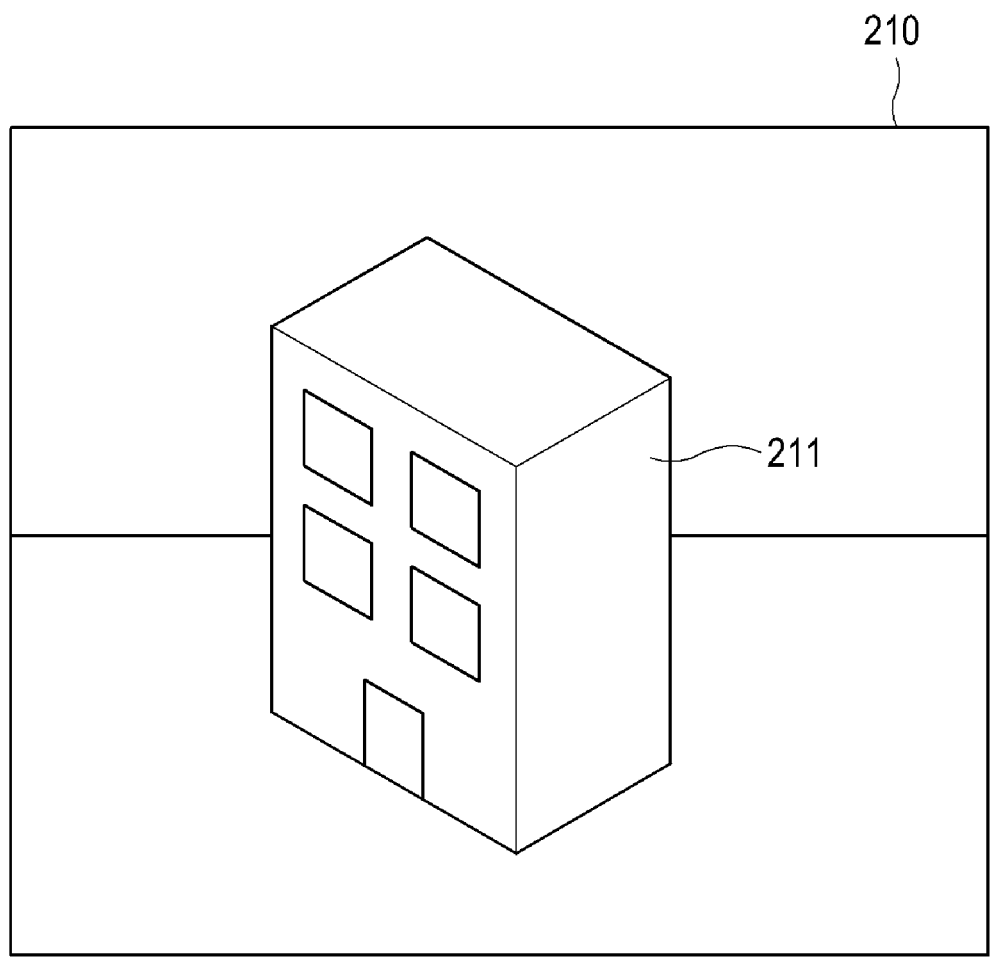
FIGS. 2A-2C respectively show an illustrative embodiment of real world source data, virtual source data, and AR data generated therefrom.
Figure 2B:
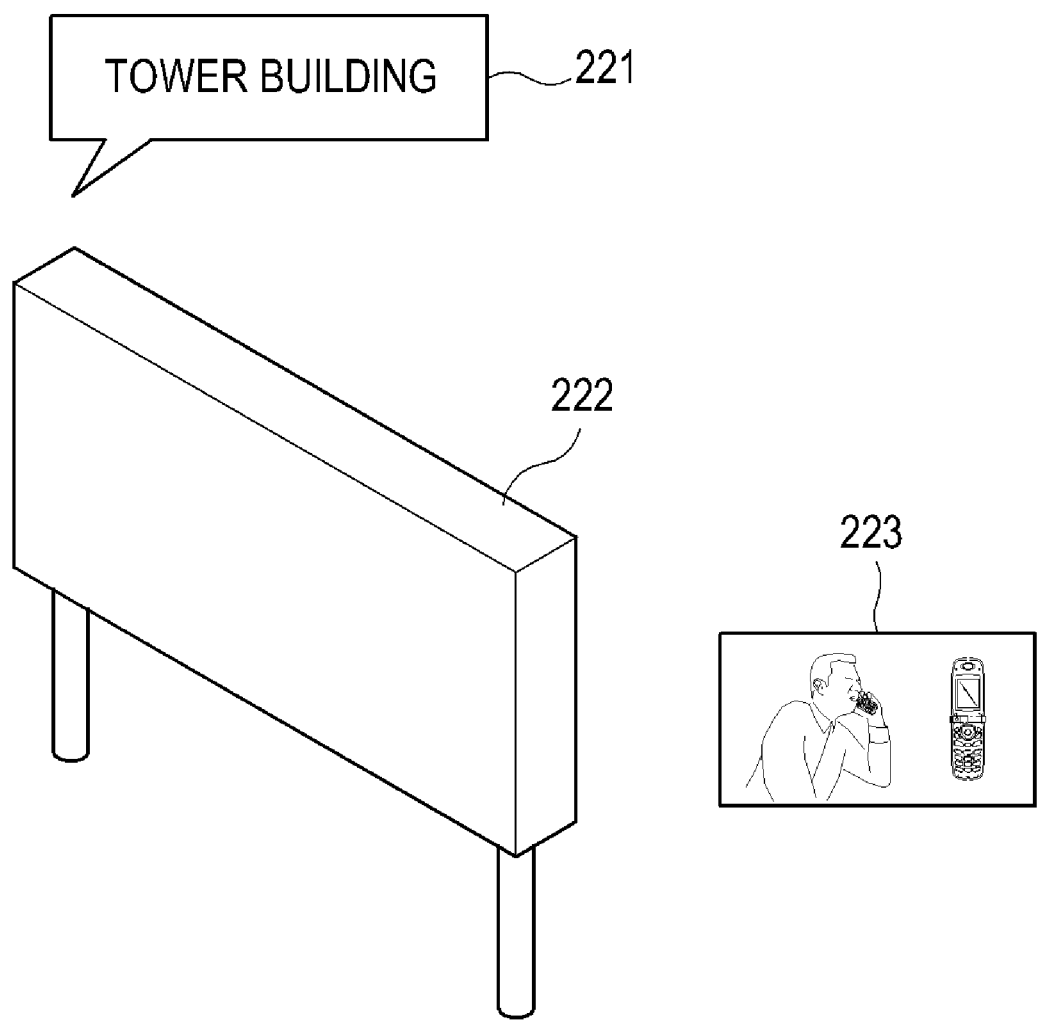
Figure 2C:
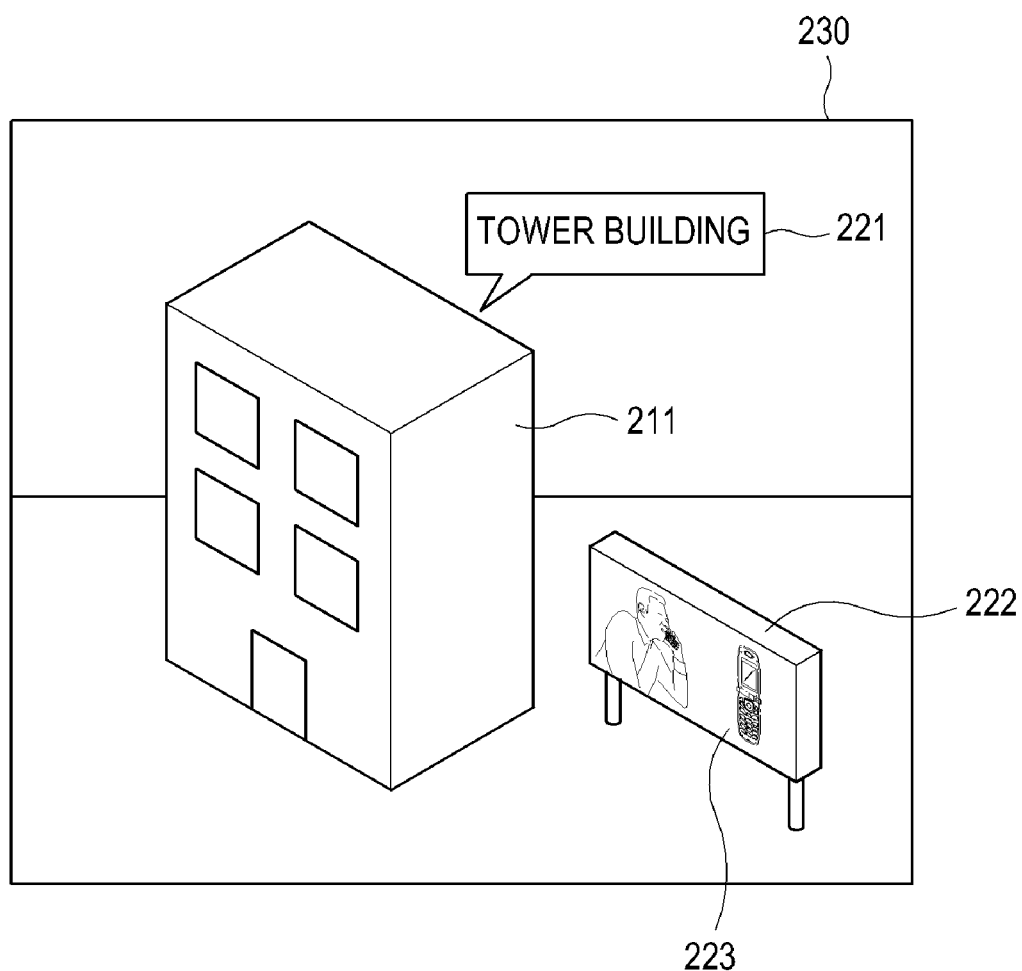

The technical details on the integration or association operation are explained with regard to FIGS. 2A-2C. FIGS. 2A-2C respectively show an illustrative embodiment of real world source data, virtual source data, and AR data generated therefrom. Referring to FIGS. 2A-2C, a real world image 210 in FIG. 2A is a real world scene of a building 211 taken by a camera (not shown). In FIG. 2B, text information on the name of building 211 is referenced as number 221, shape data on the shape of a virtual 3D object (i.e., an outdoor billboard) is referenced as number 222, and texture data or skin data (i.e., an advertisement on a product) that may be overlaid onto the 3D object is referenced as number 223. Further, in FIG. 2C, an AR image (which is generated by integrating or associating real world image 210 with text information 221, shape data 222, and texture or skin data 223) is referenced as number 230. In one embodiment, skin data 223 may be a still image. In another embodiment, texture or skin data 223 may be a video stream.

In order to generate AR image 230, various integration or association operations, such as aggregating, rendering, image registering, video tracking, and/or other signal processing operations known in the art, may be performed on the real world source data in FIG. 2A and the virtual source data in FIG. 2B. For example, text information 221 may be properly aligned or registered with building 211 depicted in real world image 210, so that one viewing AR image 230 may know that text information 221 indicates the name of building 211. Further, texture or skin data 223 may be overlaid onto a designated portion of a virtual 3D object depicted by shape data 222, so that one viewing AR image 230 may know that they together depict a billboard with an advertisement of a product. Such integration or association operations may be labor-intensive and time-consuming. This may become particularly so when such AR service is implemented in wireless terminal 110 (e.g., wireless terminal with a camera), which may have limited storage and processing resources. Service agent 130 according to the present disclosure may perform at least some of the integration or association operations that are performed to provide AR data from the source data provided by the data sources, thus alleviating wireless terminal 110 of the burden of performing such labor-intensive and time-consuming integration or association operations.

Again referring to FIGS. 1A and 1B, in one embodiment, when wireless terminal 110 is to be handed off from a currently-connected access point (e.g., when wireless terminal 110 is about to move out from coverage area 121a of access point 121 as indicated by an arrow 20 and terminate its existing communication channel 11 therewith) (see FIG. 1B), service agent 130 may selectively associate one or more prescribed types of data (e.g., audio and/or video stream data) among the received source data and transmit the selectively associated data to one or more candidate access points that are likely to be a newly-connected access point (e.g., access points 122 and 123). For the sake of simplicity, such selectively associated data will be referred herein as "sketch data." When wireless terminal 110 moves into the coverage area of one of the candidate access points (e.g., coverage area 123a of access point 123) and establishes a new communication channel (e.g., a communication channel 12) therewith, the newly-connected access point (e.g., access point 123) may forward the sketch data to wireless terminal 110 immediately after establishment of the new communication channel with wireless terminal 110 during hand-off without any time-delay (i.e., as soon as new communication channel 12 is available during hand-off).

A detailed explanation on the configurations and operations regarding the generation and transmission of the integrated data and the sketch data is given in the ensuing paragraphs.

Integrated Data Generation and Transmission

In the embodiment shown in FIGS. 1A and 1B, service agent 130 works as a hub for wireless terminal 110 in communicating with multiple data sources 140. Instead of wireless terminal 110 directly communicating with multiple data sources 140 by respectively providing them with its current location identifier (e.g., its current IP address) and requesting them to transmit source data to the current IP address, wireless terminal 110 provides its IP address with a list including at least some of multiple data sources 140. This will enable service agent 130 to request the listed data source(s) to send the source data to the IP address of service agent 130, and to generate integrated data from the source data, and transmit the integrated data to the current IP address of wireless terminal 110 received therefrom. This may significantly reduce the traffic and processing overhead of wireless terminal 110, which may be in general limited in its communication and processing resources compared to other network entities of wireless network system 100.

In another embodiment, wireless terminal 110 may hand off to another access point by updating its new IP address with single service agent 130, instead of being in communications with multiple data sources 140. Thus, the potential traffic overhead can be significantly reduced in wireless network system 100.

Further, the above configuration allows service agent 130 to perform at least some of the integration operations that are performed to provide AR data from the source data provided by data sources 140, thus alleviating wireless terminal 110 of the burden of performing such time-consuming integration operations.

Wireless terminal 110 may be a mobile phone, a personal digital assistant (PDA), a lap top, a notebook, a head mounted display (HMD), or any other mobile terminal with appropriate wireless communication means to communicate with service agent 130 through at least one of access points 120. Wireless terminal 110 may employ one or more mobility-supporting protocols known in the art (e.g., the Mobile Internet Protocol (MIP), the Dynamic Host Configuration Protocol (DHCP), and the Session Initiation Protocol (SIP)) to communicate with service agent 130 as it traverses coverage areas 121*a*-123*a* of access points 120. Wireless terminal 110 may be assigned with a unique location identifier (e.g., an IP address) by an IP address assignment server (e.g., a DHCP server) of wireless network system 100, so as to exchange data with service agent 130 along a data path along one or more routers (not shown) and/or other network entities of wireless network system 100. The IP address may aid the router(s) and other network entities in correctly forwarding the data to the access point to which wireless terminal 110 is currently connected (e.g. access point 121). While an IP address is given as an example of the unique location identifier, it should be appreciated that any other location identifiers having identical or similar functionalities as that of the IP address, such as an Internet Packet Exchange (IPX) address may be used. As wireless terminal 110 moves away from the currently connected access point and reconnects to a new access point, wireless terminal 110 may be assigned a new IP address with the same network number as the new access point assigned by the DHCP server. In one embodiment, wireless terminal 110 may be configured to periodically notify its current IP address to service agent 130 for updating.

In one embodiment, wireless terminal 110 may include one or more sensors (e.g., a camera) for obtaining one or more types of real world source data (e.g., a real world image), and may be configured to store a list including at least one of data sources 140. In one embodiment, the listed data sources may provide real and/or virtual source data that may be integrated with the real world source data obtained by wireless terminal 110 to provide desired AR data to the users of wireless terminal 110. The list may include respective IP addresses of the listed data sources or any other location identifier that may be used by a network entity (e.g., a service agent 130) in communicating with the listed data sources. Wireless terminal 110 may be configured to send a service request to provide integrated and/or sketch data with the list to service agent 130. In one embodiment, the service request may include the real world source data obtained by wireless terminal 110 or any other information that may assist the listed data sources in selecting and providing appropriate source data among source data stored therein (e.g., information indicating that wireless terminal 110 is requesting identification of the real world object depicted in a real world image obtained by wireless terminal 110).

Service agent 130 may be configured to receive the service request with the list from wireless terminal 110 and to establish a data connection with each of the data sources in the list, so as to request and receive therefrom real world and/or virtual source data. In one embodiment, service agent 130 may be configured to transmit to the data sources in the received list a source data request. The source data request may include the IP address of service agent 130. Further the source data request may include the real world source data obtained by wireless terminal 110 and/or any other information that may assist the listed data sources in selecting and providing appropriate source data among source data stored therein. For example, the source data request may include a real-world image of the statue of liberty, and a data source may store various template images of statues (e.g. including a template image of the statue of liberty) and corresponding data thereon (e.g. text data with the description "Statue of Liberty"). The data source, upon receiving the source data request with the real-world image, may determine whether there is a template image in the various stored template images that is substantially identical or similar to the real-world image showing the statue of liberty, and select and transmit the text data that corresponds to the matched template image to service agent 130.

Data sources 140 may be configured to obtain (e.g., by sensors) and/or store (e.g., in a storage unit) one or more types of real world and/or virtual source data. Upon receiving a source data request from service agent 130, data sources 140 send to service agent 130 the real world and/or virtual source data that are to be integrated with the real world source data provided by other data sources in data sources 140 and/or obtained by wireless terminal 110. In one embodiment, data sources 140 may select one or more of real world and/or virtual source data stored therein based on the information contained in the source data request received from service agent 130. For example, in the case where the source data request includes a real world image obtained by wireless terminal 110 and information indicating that wireless terminal 110 is requesting identification of the object depicted in the real world image, the data source receiving such source data request may identify the object depicted in the real world image, and then retrieve and transmit information on the identified object (e.g., text information on the name and the description thereon) to service agent 130. In another example, each of data sources 140 may provide various types of virtual source data that may be integrated to generate a virtual image of a virtual 3-dimensional (3D) object. For example, one data source may provide data on the shape of a virtual 3D object (e.g., shape data 222 of the outdoor billboard shown in FIG. 2B), whereas another data source may provide texture or skin data (e.g., texture or skin data 223 shown in FIG. 2B) that is to be overlaid onto the 3D object.

Service agent 130, upon receiving the real world and/or virtual source data from the listed data sources, may integrate or associate the received data to generate integrated data, and transmit the integrated data to wireless terminal 110. In one embodiment, the integration or association operation performed by service agent 130 may include one or more operations that may be performed in producing AR data from real world and/or virtual source data. Examples of such operations may include, but are not limited to, aggregating, rendering, image registering, video tracking, and/or other signal processing operations that are known in the art as applicable in generating AR data. For example, service agent 130 may respectively receive shape and skin data on a virtual 3D object from different data sources and generate 3D object data including alignment relationship between the shape and skin data. In one embodiment, service agent 130 may send the integrated data to the IP address of wireless terminal 110 or other equivalent location identifier (e.g., transmit the integrated data pre-pended or appended with the IP address).

In one embodiment, wireless terminal 110 may receive the integrated data from service agent 130 and integrate the received integrated data with the real world data obtained by the sensor(s) of wireless terminal 110 to generate AR data. For example, wireless terminal 110 may generate an AR image by combining a real world image of a building taken by its camera with text information on the building (e.g., its name and description thereon) and an image of a virtual billboard. In another embodiment, in cases where the integrated data need no further integration operation (e.g., in cases where a real world image is provided by one of the listed data sources and are integrated with other source data at service agent 130), wireless terminal 110 may provide the integrated data as the AR data.

Sketch Data Generation and Transmission During Hand-Off

Further to generating and transmitting integrated data, service agent 130 may be configured to generate sketch data based on the source data received from multiple data sources 140. Wireless terminal 110, as it veers from one coverage area to another, may terminate its current connection to the currently-connected access point and reconnect to the access point covering the coverage area into which wireless terminal 110 has moved (i.e., hand off from the currently-connected access point to another access point). In order to provide a seamless hand-off for wireless terminal 110 (e.g., provide uninterrupted AR service to wireless terminal 110 during hand-off without service quality degradations), service agent 130 in accordance with the present disclosure may be configured to generate sketch data, which is a "lighter" version of the integrated data (e.g., a low-resolution version of at least a portion of the integrated data and/or selectively integrated or associated data including only a prescribed type(s) of source data), and to transmit the sketch data to one or more candidate access points to which wireless terminal 110 is likely to be handed off.

In this regard, FIG. 1B illustrates a hand-off example. Referring to FIG. 2B, as indicated by an arrow 10, wireless terminal 110 may move away from access point 121, to which wireless terminal 110 is currently connected through existing communication channel 11, and toward access point 223.

In one embodiment, service agent 130 may maintain a list of one or more candidate access points (e.g., access points 122 and 123), determine whether wireless terminal 110 is likely to be handed off from currently-connected access point 121, if so, generate sketch data from the source data received from data sources 140 (see FIG. 1A), and transmit the generated sketch data to candidate access points (e.g., access points 122 and 123). The above configuration enables one of candidate access points (e.g., access point 123) to transmit the received sketch data as soon as it establishes a new communication channel (e.g., new communication channel 12) with wireless terminal 110 for hand-off.

In general, a hand-off procedure may include (a) one or more hand-off network entities of a wireless network system (i.e., network entities of the wireless network system configured to exchange signaling information during a hand-off process) determining the access point to which a wireless terminal will be handed off (hereinafter referred to as "target access point"), (b) establishing a communication channel with the target access point, terminating the existing communication channel with the currently-connected access point (this may be done sometime before or after the communication channel is established with the target access point, as well known in the art), and (c) communicating high-layer protocol messages (e.g., layer 3 and/or 4 protocol messages) with other network entities (e.g., communicating DHCP messages with a DHCP server so that DHCP server may assign a new IP address to the wireless terminal).

Service agent 130, by enabling target access point 123 to transmit the sketch data immediately after communication channel 12 is established (e.g., before a new IP address is assigned to wireless terminal 110), enables wireless terminal 110 to receive the sketch data from target access point 123 through the newly established channel as quickly as possible and use the sketch data or use the sketch data together with the integrated data in generating AR data. This will allow wireless terminal 110 to generate AR data from the received sketch data and provide the AR data to its users without interruption, even in cases where wireless terminal 110 fails to receive the integrated data or in cases where wireless terminal 110 successfully receives only a portion of the integrated data through communication channel 11 as wireless terminal 110 moves away from the currently-connected access point and moves closer to target access point 123. This may significantly reduce any quality degradation or interruption that may occur during the hand-off procedure.

Further, service agent 130, by sending the sketch data (which is a "lighter" version (e.g., a low-resolution version of at least a portion of the integrated data and/or selectively integrated or associated data including only a prescribed type(s) of source data) of the integrated data) instead of the entire integrated data through the newly established channel, improves the chance of wireless terminal 110 successfully receiving data needed in generating the AR data over the newly-established channel from target access point 123 during the hand-off procedure.

Elements of Wireless Network System

Figure 3:
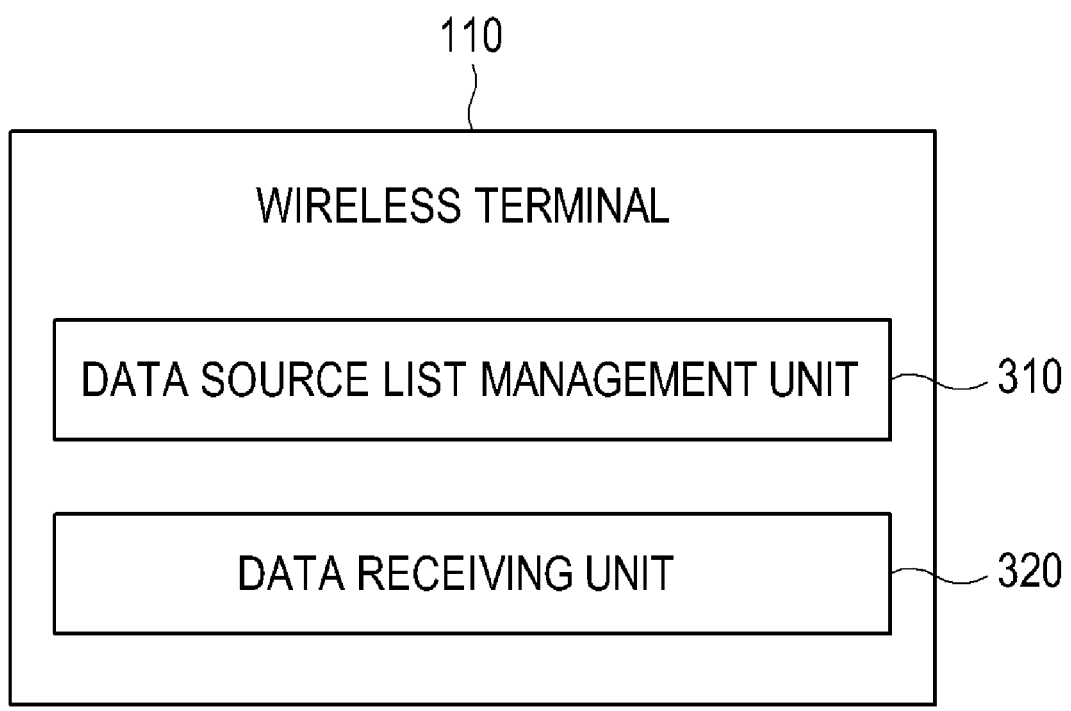
FIG. 3 shows a detailed block diagram of an illustrative embodiment of the wireless terminal shown in FIGS. 1A and 1B.

In the following description, some elements of wireless network system 100 in FIGS. 1A and 1B are explained in more detail with reference to FIGS. 3-5. FIG. 3 shows a detailed block diagram of an illustrative embodiment of the wireless terminal shown in FIGS. 1A and 1B. Referring to FIG. 3, wireless terminal 110 may include a data source list management unit 310 and a data receiving unit 320.

Data source list management unit 310 may be configured to generate a list of one or more data sources for transmission through wireless network system 100 (see FIGS. 1A and 1B). In one embodiment, data source list management unit 310 may generate the list based on information on the data sources (e.g., information including the IP addresses of the data sources) provided by one or more external devices (e.g., one or more external servers wirelessly connected to wireless terminal 110) and/or stored in a storage unit (not shown) of wireless terminal 110.

Data receiving unit 320 may be configured to receive integrated data from wireless network system 100. In one embodiment, the integrated data may be integrated data generated by service agent 130 of wireless network system 100. The integrated data may be data associated with first and second source data. The first source data may be source data provided from one or more of data sources 140. The second source data may be source data provided from one or more data sources 140 or source data provided by wireless terminal 110.

In one embodiment, data receiving unit 320 may be further configured to receive sketch data (i.e., data selectively associated with one or more prescribed types of data among the source data provided by one or more data sources 140) during hand-off of wireless terminal 110. In one embodiment, the sketch data may include a low-resolution version of at least some of the one or more prescribed types of data.

The transmission and reception operations of data source list management unit 310 and data receiving unit 320 may be done through a wireless communication unit (not shown) of wireless terminal 110. The wireless communication unit may include an antenna(s) and one or more wireless communication modules respectively adapted to communicate in accordance with one of any suitable wireless communication protocols known in the art. Examples of such wireless communication protocols include, but are not limited to, wireless wide area network (WWAN) protocols (e.g., W-CDMA, CDMA2000), wireless local area network (WLAN) protocols (e.g., IEEE 802.11a/b/g/n), wireless personal area network (WPAN) protocols, and global positioning system (GPS) protocols.

In one embodiment, wireless terminal 110 may optionally further include a sensor unit (not shown) configured to obtain real-world source data. In one embodiment, the sensor unit may include a digital camera(s), a microphone(s), and/or other sensing units well known in the art.

In one embodiment, wireless terminal 110 may optionally further include an AR unit (not shown) configured to provide AR data by associating the received integrated data and/or sketch data with the real-world source data obtained by the sensor unit. The AR unit may be configured to perform one or more integration operations known in the art (e.g., image registration, video tracking, etc.).

In one embodiment, wireless terminal 110 may optionally further include a display unit (not shown) configured to display the AR data provided by the AR unit. In one embodiment, the display unit may be implemented with a cathode ray tube (CRT), a liquid crystal display (LCD), a light-emitting diode (LED), an organic LED (OLED), and/or a plasma display panel (PDP). In another embodiment, display unit 350 may be a see-through unit that may be used in a head-up display (HUD) and/or a head-mounted display (HMD).

In one embodiments, wireless terminal 110 may optionally further include a hand-off detecting unit (not shown) configured to measure a signal strength of a signal received from a current access point in wireless network system 100 and to provide information on the signal strength to service agent 130. In one embodiment, the hand-off detecting unit may be configured to measure received signal strength (RSS) of the existing communication channel, and to provide information on the RSS to service agent 130, such that service agent 130 may determine whether wireless terminal 130 is to be handed off based on the information. In another embodiment, the hand-off detection unit may be configured to measure received signal strength (RSS) of one or more access points other than the currently-connected access point through the wireless communication unit, and to provide information on the RSS to service agent 130, such that service agent 130 may maintain a list of candidate access points.

In one embodiment, the hand-off detecting unit may be configured to provide information on at least the location or the movement direction of wireless terminal 110 (e.g., based on Global Positioning System (GPS) techniques, mobile phone tracking techniques, or other known techniques in the art) to service agent 130, such that service agent 130 may determine whether wireless terminal 110 is to be handed off based on the information. In another embodiment, the hand-off detecting unit may be configured to transmit at least a hand-off initiation message or a hand-off completion message to service agent 130, such that service agent 130 may initiate and terminate the transmission of the sketch data based on the above messages. In yet another embodiment, the hand-off detection unit may generate a list of candidate access points (e.g., based on the RSS or other known techniques) and provide it to service agent 130 through the wireless communication unit.

Figure 4:
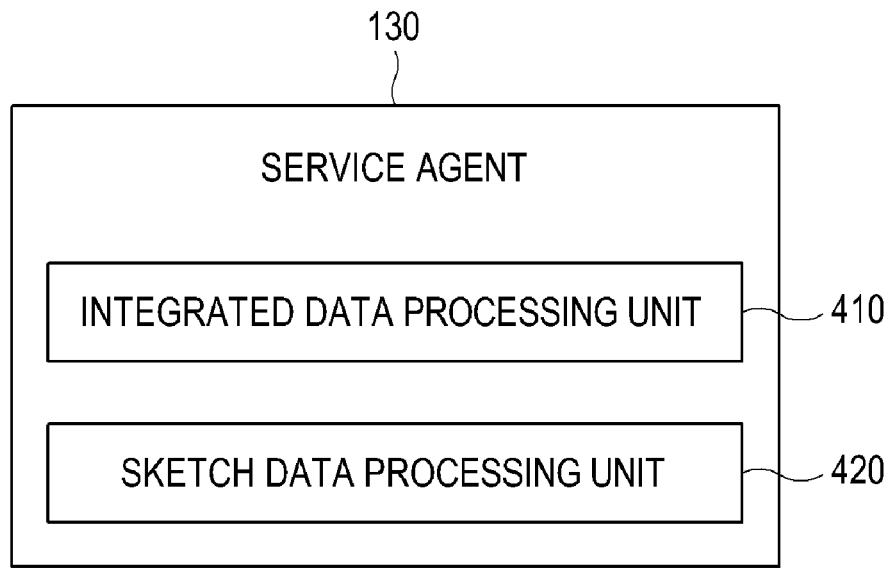
FIG. 4 shows a detailed block diagram of an illustrative embodiment of the service agent shown in FIGS. 1A and 1B.

FIG. 4 shows a detailed block diagram of an illustrative embodiment of the service agent shown in FIGS. 1A and 1B. Referring to FIG. 4, service agent 130 may include an integrated data processing unit 410, and optionally, a sketch data processing unit 420. Integrated data processing unit 410 may be configured to generate integrated data, and sketch data processing unit 420 may be configured to generate sketch data. The technical details on integrated data processing unit 410 are explained in conjunction with FIG. 5. The technical details on sketch data processing unit 420 are explained in conjunction with FIG. 6.

Figure 5:
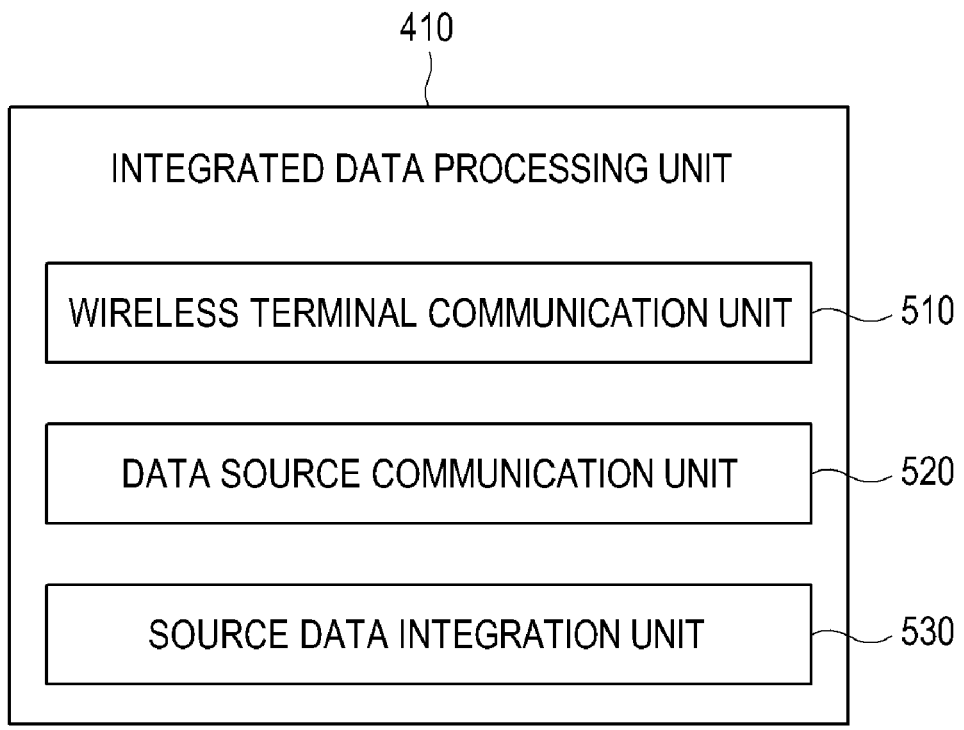
FIG. 5 shows a detailed block diagram of an illustrative embodiment of the integrated data processing unit shown in FIG. 4.

FIG. 5 shows a detailed block diagram of an illustrative embodiment of the integrated data processing unit shown in FIG. 4. Referring to FIG. 5, integrated data processing unit 410 may include a wireless terminal communication unit 510, a data source communication unit 520, and a source data integration unit 530.

Wireless terminal communication unit 510 may be in communication with wireless terminal 110 through wireless network system 100 and may be configured to receive a list of one or more data sources from wireless terminal 110. The list may include information on data sources 140 (e.g., the IP addresses of data sources 140).

Data source communication unit 520 may be configured to receive source data from the one or more data sources in the list. For example, data source communication unit 520 may be configured to request source data for wireless terminal 110 to the one or more data sources and receive the requested source data therefrom.

The transmission and reception operations of wireless terminal communication unit 510 and data source communication unit 520 may be done through a communication unit (not shown) of service agent 130. In one embodiment, the communication unit may include an antenna(s) and one or more communication modules respectively adapted to communicate in accordance with one of any suitable communication protocols known in the art. Examples of such communication protocols include, but are not limited to, wide area network (WAN) protocols, local area network (LAN) protocols, and personal area network (PAN) protocols.

Source data integration unit 530 may be configured to use the received source data to generate the integrated data for transmission to wireless terminal 110. In one embodiment, source data integration unit 530 may be configured to generate the integrated data by performing one or more integration operations that may be performed in producing AR data from the received source data. Examples of such operations may include, but are not limited to, aggregating, rendering, image registering, video tracking, and/or other signal processing operations that are known in the art as applicable in generating AR data.

Figure 6:
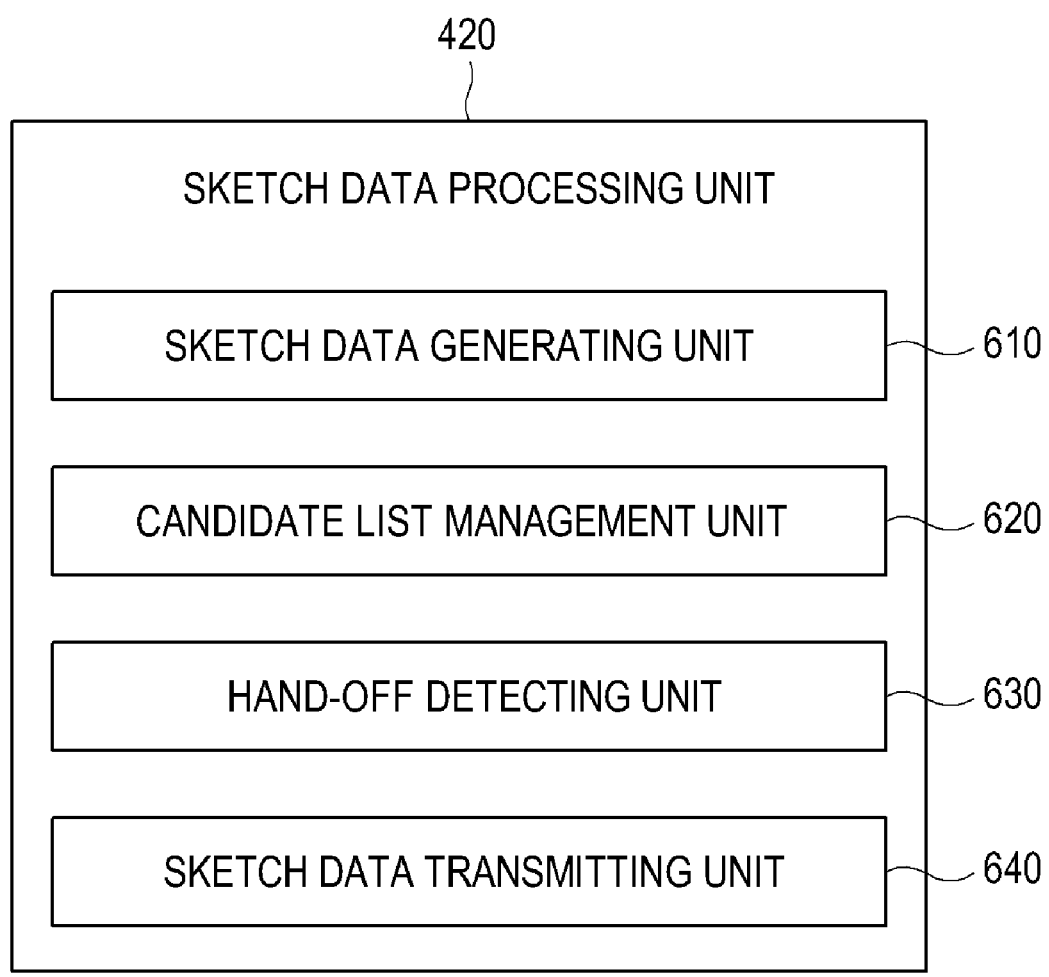
FIG. 6 shows a detailed block diagram of an illustrative embodiment of the sketch data processing unit shown in FIG. 4.

FIG. 6 shows a detailed block diagram of an illustrative embodiment of the sketch data processing unit shown in FIG. 4. Referring to FIG. 6, sketch data processing unit 420 may include a sketch data generating unit 610, a candidate list management unit 620, a hand-off detecting unit 630, and a sketch data transmitting unit 640.

Sketch data generating unit 610 may be configured to selectively associate one or more prescribed types of data among source data received by data source communication unit 520, so as to generate sketch data. Examples of such prescribed data types include, but are not limited to, audio stream data and video stream data, which may be transmitted to wireless terminal 110 in real-time without any interruption. In the another embodiment, sketch data generating unit 610 may be configured to generate a low-resolution version of at lest some of the one or more prescribed types of data, and to associate the low-resolution version of the at least some of the one or more prescribed types of data with the rest of the one or more prescribed types of data.

Candidate list management unit 620 may be configured to provide a list of one or more candidate access points for wireless terminal 110. In one embodiment, candidate list management unit 620 may be configured to receive information on the one or more candidate access points from wireless network system 100, such as one or more hand-off network entities of wireless network system 100, and to generate a list of candidate access points (or a candidate access point list) based on the received information. Examples of such hand-off network entities include, but are not limited to, wireless terminal 110, access points 120, and/or other hand-off related network entities of wireless network system 100 not shown in FIGS. 1A and 1B (e.g., a gateway GPRS support node (GGSN), Gateway, a serving GPRS support node (SGSN), a server, etc.). Automatic neighbor relation (ANR) techniques and/or other technologies known in the art may be employed by wireless terminal 110, access points 120, and/or other hand-off related network entities in providing the information on the candidate access point list to candidate list management unit 620.

In another embodiment, candidate list management unit 620 may be configured to generate the candidate access point list based at least in part on (a) the location and/or the movement direction of wireless terminal 110, (b) information on a proximity degree of the one or more candidate access points in the movement direction of wireless terminal 110, and/or (c) whether the one or more candidate access points are located in the movement direction of wireless terminal 110. For example, candidate list management unit 620 may determine the location and/or the movement direction of wireless terminal 110, find one or more access points in proximity to and/or located at the movement direction of wireless terminal 110, and select at least one of the access points in proximity to and/or located at the movement direction of wireless terminal 110 as the candidate access point(s).

In one embodiment, candidate list management unit 620 may be configured to receive the information on at least the location or the movement direction of wireless terminal 110 from wireless network system 100. For example, candidate list management unit 620 may receive such information from wireless terminal 110, access points 120, and/or other hand-off related network entities of wireless network system 100 not shown in FIGS. 1A and 1B (e.g., a gateway GPRS support node (GGSN), Gateway, a serving GPRS support node (SGSN), etc.). GPS technologies, mobile phone tracking technologies (e.g., angle of arrival (AOA), time of arrival (TOA), etc.), and/or other technologies known in the art may be employed by wireless terminal 110, access points 120, and/or other hand-off related network entities in providing such location and/or movement direction information to candidate list management unit 620.

Hand-off detecting unit 630 may be configured to determine whether wireless terminal 110 is to be handed off from a currently-connected access point to another access point, and to generate a hand-off initiation signal for sketch data transmitting unit 640 (such that sketch data transmitting unit 640 may start the transmission of the sketch data). In one embodiment, hand-off detecting unit 630 may receive information, such as a hand-off initiation message, from wireless network system 100 (e.g., a hand-off network entity of wireless network system 100), and then generate the hand-off initiation signal. Examples of such hand-off network entities include, but are not limited to, wireless terminal 110, access points 120, and/or other hand-off related network entities of wireless network system 100 not shown in FIGS. 1A and 1B. For example, wireless terminal 110 and/or one of access points 120 may be configured to measure the received signal strength (RSS) of a communication channel therebetween, to initiate a hand-off procedure when the measured RSS is above or below a prescribed threshold value, and to notify hand-off detecting unit 630 of the hand-off initiation.

In another embodiment, hand-off detecting unit 630 may be configured to receive information on the RSS of wireless terminal 110 from wireless network system (e.g., a hand-off network entity of wireless network system 100), and determine whether wireless terminal 110 is to be handed off based on the received information, so as to generate a hand-off initiation signal for sketch data transmitting unit 640. Hand-off detecting unit 630 may be configured to generate a hand-off initiation signal for sketch data transmitting unit 640 when it is determined that wireless terminal 110 would be handed off to another access point.

In one embodiment, sketch data transmitting unit 640 may be configured to provide the generated sketch data to wireless terminal 110 through at least one of the candidate access points, when wireless terminal 110 is to be handed off. In one embodiment, sketch data transmitting unit 640 may start transmitting the sketch data upon receiving the hand-off initiation signal from hand-off detecting unit 630. Further, in one embodiment, sketch data transmitting unit 640 may terminate the transmission of the sketch data in response to a hand-off completion message from wireless network system (e.g., a hand-off network entity of wireless network system 100). For example, a hand-off network entity, such as wireless terminal 110 and/or one of access points 120, may be configured to notify sketch data transmitting unit 640 when the hand-off is completed.

Processes Performed by Elements of Wireless Network System

In the following, some processes performed by some elements of a wireless network system in accordance with present disclosure are explained in more detail with reference to FIGS. 7 and 8. FIG. 7 shows an example flow diagram of an illustrative embodiment for providing integrated data. Referring to FIG. 7, a wireless terminal of a wireless network system provides a list of one or more data sources to a service agent of the wireless network system (block 710). In block 720, the service agent requests and receives source data from the one or more data sources. In block 730, the service agent integrates the received source data to generate integrated data, and then, transmits the integrated data to the wireless terminal (block 740). Thereafter, the wireless terminal receives integrated data and generates AR data from the received integrated data (block 750), and the process is terminated.

FIG. 8 shows an example flow diagram of an illustrative embodiment for providing sketch data. Referring to FIG. 8, a service agent of a wireless network system maintains a list of candidate access points (or a candidate access point (AP) list) (block 810). In one embodiment, the service agent may generate or update the list of candidate access points based on the list of the candidate access points received from a hand-off network entity of the wireless network. In another embodiment, the service agent may generate or update the list of candidate access points by determining at least one of a location and a movement direction of the wireless terminal, finding one or more access points at least in proximity to or located at the movement direction of the wireless terminal, and selecting at least one of the access points at least in proximity to or located at the movement direction of the wireless terminal as the candidate access point. In the above embodiment, the service agent may determine at least one of a location and a movement direction based on the information on at least the location or the movement direction of the wireless terminal received from a hand-off network entity of the wireless network system.

In block 820, the service agent determines whether the wireless terminal is to be handed off. In one embodiment, the service agent may determine whether the wireless terminal is to be handed off based on a hand-off initiation message for the wireless terminal received from a hand-off network entity of the wireless network system.

If the wireless terminal is to be handed off, the service agent generates sketch data from the received source data (block 830). In one embodiment, the service agent may selectively integrate one or more prescribed types of data in the source data as the sketch data. In another embodiment, the service agent may generate a low-resolution version of at least a portion of the integrated data as the sketch data. If not, the process returns to block 820. In block 840, the service agent transmits the sketch data to at least one of the multiple candidate access points, so as to enable at least one of the candidate access points to forward the sketch data to the wireless terminal.

In block 850, the one of the access points forwards the sketch data to the wireless terminal upon establishment of a communication channel with the wireless terminal. In block 860, the wireless terminal receives the integrated data from the currently connected access point and/or the sketch data from the one of the candidate access points and generates AR data from the integrated data and/or the sketch data. In block 870, the service agent terminates the transmission of the sketch data when the hand-off of the wireless terminal is complete.

It should be appreciated that the structural and functional configurations of the wireless network system and its elements described in conjunction with FIGS. 1A, 1B, 2A-2C, and 3-8 are indicative of a few ways in which a wireless network system may be implemented. The techniques described herein may be applied to other types of wireless network systems providing data integration services other than the AR service. For example, in some embodiment, the techniques may be applied to sensor networks including multiple sensors as data sources. For example, multiple cameras positioned at different locations and/or orientations may provide multiple source image data, which may be integrated to form integrated data depicting a 3D virtual space. A wireless HMD may provide a virtual space image based on the pose and location of the HMD. In one embodiment, a service agent may be configured to receive a list including such multiple cameras from the wireless HMD, to request and receive the source image data from the multiple cameras, and to integrate the received source image data to create the 3D space data. In this embodiment, the wireless HMD may provide the pose and location information of the wireless HMD to the service agent, and the service agent may generate and provide to the wireless HMD a virtual space image of the 3D virtual space based on the received pose and location information. It should be appreciated that the techniques described herein may be easily implemented to numerous types of wireless networks configured to numerous types of data integration services without departing from the scope and spirit of this disclosure.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third, and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. An apparatus configured to communicate with a wireless terminal through a wireless network system, comprising:
   a wireless terminal communication unit configured to receive a list of one or more data sources from the wireless terminal;
   a data source communication unit configured to receive source data from the one or more data sources in the list;
   a source data integration unit configured to use the source data to generate integrated data for transmission to the wireless terminal;
   a sketch data generating unit configured to selectively associate one or more prescribed types of data among the source data and to generate a low-resolution version of the selectively associated data;
   a candidate list management unit configured to provide a list of one or more access point candidates for the wireless terminal; and
   a sketch data transmitting unit configured to provide the low-resolution version of the selectively associated data to the wireless terminal through at least one of the one or more access point candidates, when the wireless terminal is to be handed off.

2. The apparatus of claim 1, wherein the one or more data sources include two data sources and wherein the source data integration unit is configured to associate source data received from each of the two data sources to generate the integrated data.

3. The apparatus of claim 1, wherein the one or more prescribed types of data include at least video or audio stream data.

4. The apparatus of claim 1, wherein the sketch data transmitting unit is further configured to terminate the transmission of the selectively associated data in response to a hand-off completion message from the wireless network system.

5. The apparatus of claim 1, wherein the candidate list management unit is further configured to receive information on the one or more access point candidates from the wireless network system.

6. The apparatus of claim 1, wherein the candidate list management unit is further configured to generate the list of one or more access point candidates, based on infol1l1ation on at least one of a location and a movement direction of the wireless terminal, information on proximity degree of the one or more access point candidates in the movement direction of the wireless terminal or on whether the one or more access point candidates are located in the movement direction of the wireless terminal.

7. The apparatus of claim 6, wherein the candidate list management unit is further configured to receive the information on at least the location or the movement direction of the wireless terminal from the wireless network system.

8. The apparatus of claim 1, further comprising a hand-off detecting unit configured to receive a hand-off initiation notification from the wireless network system, and to generate a hand-off initiation signal for the sketch data transmitting unit.

9. The apparatus of claim 1, further comprising a handoff detecting unit configured to receive information on a received signal strength (RSS) of the wireless terminal from the wireless network system, and to deten|1 ine whether the wireless terminal is to be handed off based on the received RSS information so as to generate a hand-off initiation signal for the sketch data transmitting unit.

10. The apparatus of claim 1, wherein the source data integration unit is configured to associate the source data with data received from the wireless terminal to generate the integrated data.

11. A wireless terminal comprising:
   a data source list management unit configured to generate a list of one or more data sources for transmission through a wireless network system to a data source communication unit configured to receive source data from the one or more data sources in the list; and
   a data receiving unit configured to receive integrated data of first source data and second source data associated therewith from the wireless network system, the first source data being provided from the one or more data sources, the second source data being provided from the one or more data sources or tile wireless terminal,
   the data receiving unit further configured to receive sketch data that comprises selectively associated data during hand-off of the wireless terminal between access points in the wireless network system, wherein the selectively associated data includes a low-resolution version of data selectively associated with one or more prescribed types of data among source data provided by the one or more data sources.

12. The wireless terminal of claim 11, wherein the wireless terminal provides the list to an apparatus, the apparatus generating the integrated data, and
   wherein the wireless terminal further comprises a hand-off detection unit configured to measure a signal strength of a signal received from a current access point in the wireless network system and to provide information on the signal strength to the apparatus.

13. The wireless terminal of claim 12, wherein the hand-off detection unit is configured to transmit at least a hand-off initiation message or a hand-off completion message to the apparatus.

14. The wireless terminal of claim 11, further comprising, a sensor unit configured to obtain real-world data.

15. The wireless terminal of claim 14, further comprising an augmented reality (AR) unit configured to provide AR data by associating the integrated data with the obtained real-world data.

16. A method for transmitting data over a wireless network system, comprising:
- receiving a list of multiple data sources from a wireless terminal in the wireless network system;
- receiving source data from two or more of the multiple data sources, the source data including shape data of a virtual object and texture data;
- selectively associating one or more prescribed types of data among the received source data;
- generating integrated data with source data from the two or more data sources, the integrated data including a texture-mapped virtual object;
- transmitting at least some of the integrated data to the wireless terminal;
- maintaining a list of one or more access point candidates, wherein each of the access point candidates is configured to enable the wireless terminal to wirelessly communicate with the wireless network system through the respective access point candidates;
- determining that the wireless terminal is to be handed off from a current access point;
- generating sketch data with the selectively associated data, the sketch data including a low-resolution version of the selectively associated data; and
- transmitting the sketch data to at least one of the access point candidates, wherein the sketch data is forwarded to the wireless terminal in response to the at least one of the access point candidates establishing a communication channel with the wireless terminal during the hand-off.

* * * * *

UNITED STATES PATENT AND TRADEMARK OFFICE
CERTIFICATE OF CORRECTION

PATENT NO. : 8,275,375 B2
APPLICATION NO. : 12/731955
DATED : September 25, 2012
INVENTOR(S) : Lee It is certified that error appears in the above-identified patent and that said Letters Patent is hereby corrected as shown below:

In Column 9, Line 26, delete "embodiments," and insert -- embodiment, --, therefor.

In Column 10, Line 59, delete "lest" and insert -- least --, therefor.

In Column 16, in Line 9, in Claim 6, delete "info|1|lation" and insert -- information --, therefor.

In Column 16, in Line 28, in Claim 9, delete "deten|1 ine" and insert -- determine --, therefor.

Signed and Sealed this
First Day of January, 2013

David J. Kappos
*Director of the United States Patent and Trademark Office*